Nov. 11, 1941.    B. E. SHAW    2,262,343
THERMOSTAT
Filed Dec. 6, 1939
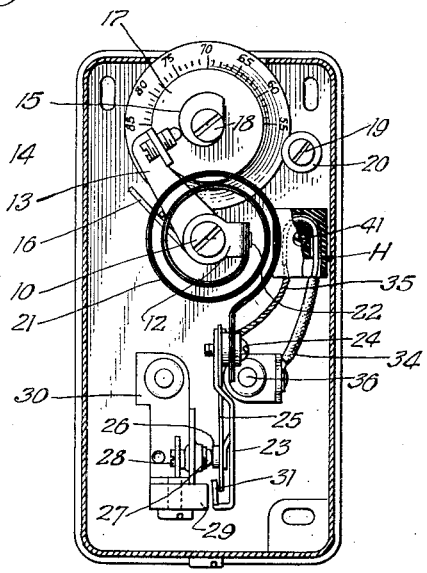
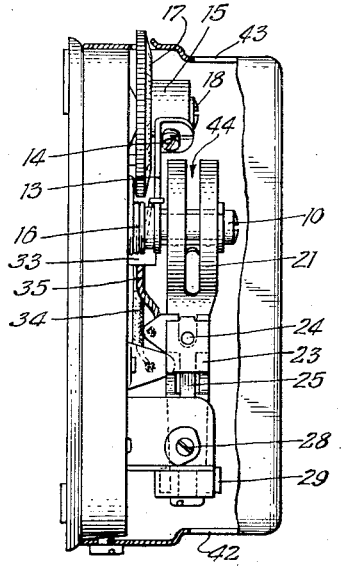
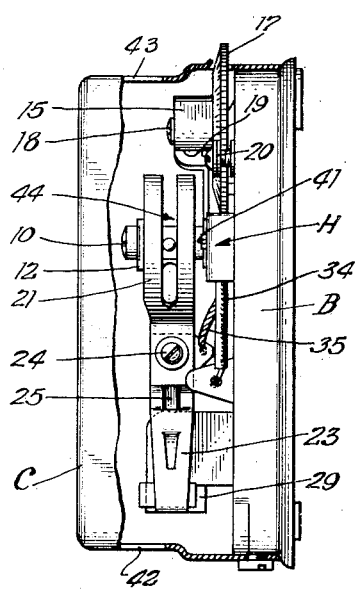
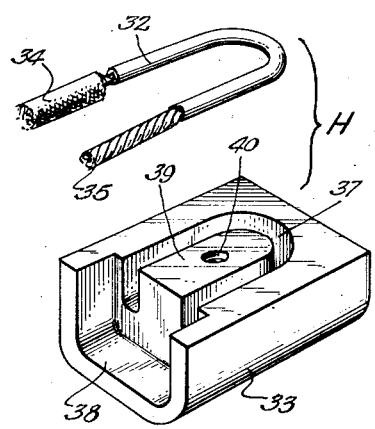
Inventor:
Burton E. Shaw
By:
Bair & Freeman
Attorneys:

Patented Nov. 11, 1941

2,262,343

UNITED STATES PATENT OFFICE 2,262,343

THERMOSTAT

Burton E. Shaw, Bristol, Ind., assignor to Penn Electric Switch Co., Goshen, Ind., a corporation of Iowa Application December 6, 1939, Serial No. 307,828

6 Claims. (Cl. 200—122)

This invention relates to a thermostat, particularly a room thermostat designed to operate at line voltage and directly control a burner motor or other device, which in turn is operable to operate a heating plant or other temperature changing device.

One object of the invention is to provide a room thermostat of the "anticipating" type wherein a heater for supplying auxiliary heat to the temperature responsive element of the thermostat is provided, the heater including a loop of resistance wire and a casing of dielectric material therefor, the heater being comparatively simple and inexpensive from a manufacturing standpoint.

Another object is to provide a heater in which the resistance wire may be readily changed to suit different installations and a casing therefor is demountable relative to the base of the thermostat to permit changing or replacing the resistance wire of the heater, and to eliminate the possibility of damaging the heater as when it is formed of a resistance wire moulded in a casing of ceramic or Bakelite material.

A further object is to provide a bimetal element having a slot therein to permit ready passage of air around all portions of the bimetal element and thus quick response of the bimetal element to changes in temperature.

With these and other objects in view, my invention consists in the construction, arrangement and combination of the various parts of my device whereby the objects contemplated are attained, as hereinafter more fully set forth, pointed out in my claims and illustrated in the accompanying drawing, wherein:

Figure 1 is a front elevation of a thermostat embodying my invention showing the casing thereof with its front wall removed and the remaining walls in section;

Figure 2 is a side elevation of the left side of Figure 1, with the casing partially in section;

Figure 3 is a side elevation of the right side of Figure 1, again showing the casing partially in section, and Figure 4 is a bottom perspective view of a resistance wire and a dielectric casing therefor which constitute a heater in my thermostat.

On the accompanying drawing, I have used the reference character B to indicate a base and C a casing of my thermostat. Upstanding from the base B is a post 10 on which a bracket 12 is oscillatably mounted. The bracket 12 has an arm 13 provided with an adjusting set screw 14 engaging a cam 15. A spring 16 biases the bracket 12 and arm 13 clockwise in Figure 1 to effect such engagement of the adjusting set screw 14 with the cam 15.

The cam 15 is provided for the purpose of adjusting the position of the bracket 12. An adjusting disc 17 is secured to the cam and projects to a position above the base B where it may be engaged by the finger of the operator and rotated. Such rotation occurs relative to another upstanding post 18 from the base B. If desired, the cam 15 can be locked against unauthorized adjustment by a screw 19 which engages a washer 20 with the disc 17.

A bimetal element 21 of coiled arrangement has one end anchored as at 22 to the bracket 12. Its other end has a switch arm 23 secured thereto by a screw 24.

The switch arm 23 carries a leaf spring 25 which in turn carries a movable contact 26. The movable contact 26 is adapted to coact with a stationary contact 27 mounted on a differential adjusting screw 28. A small permanent horseshoe magnet 29 is mounted on a terminal bracket 30 and coacts with an armature portion 31 of the switch arm 23 to provide snap action for the contacts.

A heater H is provided which consists of a loop 32 of resistance wire and a casing 33 of dielectric material. The resistance wire 32 has a pair of pigtails 34 and 35 adapted for connection with a terminal screw 36 and the switch arm 24, respectively. The casing 32 has in its lower surface a loop-shaped groove 37 adapted to receive the loop of resistance wire 32. An enlarged cavity 38 in the casing 32 permits entrance of the pigtails 34 and 35 to the loop 32.

Between the legs of the U-shaped groove 37 there is a projection 39 and a perforation 40 extends through this projection to the top of the casing 33. The perforation 40 is adapted to receive a screw 41 which is threaded into the base B. The groove 37, it will be noted, is still wider than the diameter of the resistance wire 32, so that a larger resistance wire may be used with the same casing. Obviously, a smaller one could also be used where the installation calls for such.

The casing 33 may be made of any suitable material such as Bakelite, lavite or the like, and by being mounted on the base B by the screw 41 is readily removable, so that the resistance wire 32 can be replaced or changed without the necessity of providing a different casing 33. Heretofore, heaters for anticipating type thermostats wherein the heater is adapted to supply a small amount of auxiliary heat to the bimetal element when the circuit is closed, have been provided wherein the resistance wire is embedded in a molded Bakelite or ceramic casing. Suitable brackets must be provided for supporting such casings, and in mounting them in the bracket there is apt to be breakage. Also, whenever it is necessary to change the size of the resistance wire to take care of a different installation, a complete unit of a resistance wire and dielectric casing must be substituted. With my arrangement, this is not the case and all breakage is eliminated, since the casing 33 is held in position by a screw passing directly through it instead of using a clamp bracket or the like. Heaters of the type wherein the resistance wire is molded in a casing are also subject to breakage during production due to the forces of expansion and contraction acting after the casing is molded. Obviously, with my arrangement such possibility is entirely eliminated.

In order to make the bimetal element 21 readily responsible to the air drifting upwardly through openings 42 in the bottom of the casing C and openings 43 in the top thereof, I have provided a slot 44 in the bimetal element which separates the element into two spaced parts, as shown in Figures 2 and 3. The air can readily pass through the slot, thus facilitating contact of the air with all portions of the bimetal element, and a resulting quick response of the bimetal element to changes in the temperature of the air.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. A thermostat comprising a base, a stationary post upstanding therefrom, a bracket oscillatable on said post, means biasing said bracket to oscillate in one direction thereon and in a plane parallel to said base, a cam engaged by said bracket under the bias of said means, a coiled bimetal element having one end anchored to said bracket, a switch arm carried by the other end thereof, switch contacts controlled thereby, a heater in series with said contacts to supply auxiliary heat to said bimetal element when the circuit is established through said contacts, said heater comprising a U-shaped loop of resistance wire and a dielectric casing therefor, said loop of resistance wire and said casing being mounted against said base, and a screw extending through said casing and into said base for retaining said casing thereon, said casing having U-shaped groove in the surface thereof next to said base to receive said loop of resistance wire.

2. A thermostat comprising a base, a bimetal element mounted thereon, a switch arm carried by said element, switch contacts controlled thereby, a heater in series with said contacts to supply auxiliary heat to said bimetal element, said heater comprising a U-shaped loop of resistance wire and a dielectric casing therefor, said loop of resistance wire and said casing being secured against said base and having U-shaped groove in the surface thereof next to said base to receive said loop of resistance wire.

3. A thermostat comprising a base, a coiled bimetal element mounted thereon, a switch arm carried by said element, switch contacts controlled thereby, said bimetal element, intermediate said bracket and said switch arm, being provided with a slot separating portions of the bimetal element from each other whereby air drifting across said base may readily contact with all portions of said bimetal element, a heater in series with said contacts to supply auxiliary heat to said bimetal element when the circuit is established through said contacts, said heater comprising a loop of resistance wire, a pair of pigtails connected therewith, one for attachment to a terminal on said base and the other for connection with one of said contacts, said heater further comprising a dielectric casing for said loop of resistance wire, said casing being removably positioned on said base, means for securing said casing to said base comprising a screw passing through the casing between the legs of said loop of resistance wire and into the base, said casing having an open bottom loop-shaped groove therein spaced from opposite sides of said screw and receiving said loop of resistance wire.

4. A thermostat comprising a base, a post upstanding therefrom, a bracket oscillatable on said post, means biasing said bracket to oscillate in one direction thereon, a cam engaged by said bracket under the bias of said means, a spirally coiled bimetal element having one end anchored to said bracket, a switch arm carried by the other end thereof, switch contacts controlled thereby, the coil of said bimetal element, intermediate said bracket and said switch arm, being provided with a slot separating portions of the bimetal element from each other whereby air drifting upwardly across said base may readily contact with all portions of said bimetal element, and a heater in series with said contacts to supply auxiliary heat to said bimetal element when the circuit is established through said contacts.

5. A thermostat comprising a support, a temperature responsive switch mounted thereon, a heater in series with said switch to supply auxiliary heat to said temperature responsive switch when the circuit is established therethrough, said heater comprising a loop of resistance wire, a pair of pigtails connected therewith, a dielectric casing for said loop of resistance wire, said casing being removably positioned on said support, and means for securing said casing to said support comprising a screw passing through the casing between the legs of said loop of resistance wire and into the support, said casing having an open bottom loop-shaped groove therein spaced by the material of the casing from opposite sides of said screw and receiving said loop of resistance wire.

6. A thermostat comprising a support, a temperature responsive switch mounted thereon, a heater in series with said switch to supply auxiliary heat to said temperature responsive switch when the circuit is established therethrough, said heater comprising a length of resistance wire, a pair of pigtails connected therewith, a dielectric casing for said length of resistance wire, and means for securing said casing to said support, said casing having a groove therein open toward the support and receiving said length of resistance wire.

BURTON E. SHAW.